United States Patent [19]
Liakumovich et al.

[11] 3,887,632
[45] June 3, 1975

[54] PROCESS FOR PURIFYING DIENE HYDROCARBONS FROM ACETYLENE HYDROCARBON CONTAMINANTS

[76] Inventors: Alexandr Grigorievich Liakumovich, Prospekt Lenina, 23, kv. 4; Nina Vasilievna Zakharova, ulitsa Khudaiberdina, 97, kv. 16; Rashid Idrisovich Khamidullin, Prospekt Lenina, 23, kv. 4, all of Sterlitamak Bashkirskoi; Vladimir Mikhailovich Zakrevsky, ulitsa Ushakova, 40a, kv. 53, Tolyatti Kuibyshevskoi oblasti, all of U.S.S.R.

[22] Filed: Oct. 11, 1972

[21] Appl. No.: 296,648

[52] U.S. Cl. .................................... 260/681.5 R
[51] Int. Cl. ............................ C07c 5/16; C07c 7/00
[58] Field of Search .... 260/681.5 R, 94.2 M, 677 H

[56] References Cited
UNITED STATES PATENTS

| | | | |
|---|---|---|---|
| 2,426,604 | 9/1947 | Frevel | 260/681.5 |
| 3,541,178 | 11/1970 | Nettesheim | 260/681.5 |
| 3,560,404 | 2/1971 | Jung et al. | 252/414 |
| 3,591,522 | 7/1971 | Cosyns et al. | 260/683.9 |
| 3,634,536 | 1/1972 | Frevel et al. | 260/681.5 |
| 3,651,167 | 3/1972 | De Rosset | 260/681.5 |

Primary Examiner—Paul M. Coughlan, Jr.

[57] ABSTRACT

In the purification of diene hydrocarbons by hydrogenation of acetylene hydrocarbons contained therein with hydrogen on a hydrogenation catalyst, prior to the hydrogenation stage, the catalyst is washed or washed and flooded with a saturated liquid hydrocarbon.

4 Claims, No Drawings

PROCESS FOR PURIFYING DIENE HYDROCARBONS FROM ACETYLENE HYDROCARBON CONTAMINANTS

The present invention relates to the purification of diene hydrocarbons from contaminants such as acetylene hydrocarbons. Said contaminants hinder the synthesis of stereo-specific diene polymers and impair the activity of a polymerization catalyst.

A process is known for purifying diene hydrocarbons from acetylene hydrocarbons by way of hydrogenation of said contaminants with hydrogen on a hydrogenation catalyst (vcf. U.S. Pat. Nos. 2,946,829 and 3,091,654).

Said process has a disadvantage residing in significant losses of the diene hydrocarbons to be treated during hydrogenation thereof. For this reason, a complete purification of diene hydrocarbons from said contaminants is practically impossible.

In addition, upon deep hydrogenation of dienes a great amount of heat is evolved which results in overheating of the catalyst and polymerizing dienes on the active surface of the catalyst. These phenomena considerably reduce the catalyst service life (as low as 1,000 hours).

It is an object of the present invention to provide a process for purifying diene hydrocarbons which would enable a complete purification of said hydrocarbons from acetylene hydrocarbon contaminants without losses of the products being treated.

It is another object of the present invention to increase the selectivity and service life of the hydrogenation catalyst.

These and other objects of the present invention are accomplished by hydrogenating acetylene hydrocarbon contaminants on a hydrogenation catalyst. Said catalyst is washed with a saturated liquid hydrocarbon prior to the hydrogenation process.

Such treatment results in partially removing hydrogen adsorbed during the catalyst activation process from the catalyst surface. This permits the purification to be conducted without deep hydrogenation of diene hydrocarbons which is of special importance at the initial moment of the process. Elimination of deep hydrogenation of dienes makes it possible to considerably prolong the catalyst service life (up to 8,000 hours), increase its selectivity, and completely purify diene hydrocarbons from the above-mentioned contaminants.

It is advisable, for the purpose of improving heat-removal conditions during the hydrogenation, to flood the catalyst with a saturated liquid hydrocarbon after said washing.

For washing and flooding the hydrogenation catalyst, any saturated liquid hydrocarbons may be used; however, from technological considerations, it is advisable to employ propane, butane, and isopentane.

The process for purifying diene hydrocarbons from acetylene hydrocarbon impurities according to the present invention may be effected as follows.

A hydrogenation catalyst, such as nickel-on-kieselguhr, Raney nickel, nickel-copper, is preactivated by passing hydrogen therethrough at a temperature of 250°–320°C for several hours. Then the catalyst is cooled and washed with a liquid saturated hydrocarbon such as propane, butane, isopentane, cyclohexane. After such treatment, hydrogen and a diene hydrocarbon containing acetylene hydrocarbon contaminants are passed through the catalyst.

Since the diene hydrocarbon is practically not hydrogenated in the purification process, the evolution of hydrogenation heat is insignificant and a temperature drop along the reactor height does not exceed 2° to 8°C. Therewith, there is no contamination of the catalyst with resinous products.

It is advantageous to flood the catalyst with a saturated liquid hydrocarbon after said washing, whereby further improving of the catalyst selectivity and stability occurs due to improved heat-removal conditions.

As has been mentioned hereinbefore, any saturated liquid hydrocarbon may be used for washing and flooding of the catalyst. From technological considerations, however, it is advisable, during purification of, e.g., isoprene, to flood and wash the catalyst with isopentane, while in the case of butadiene purification it is desirable to employ butane, respectively, and so forth.

For a better understanding of the present invention the following examples are given hereinbelow, illustrating the process for purifying diene hydrocarbons from acetylene hydrocarbon contaminants.

EXAMPLE 1

A catalyst containing 50% by weight of nickel oxide deposited on kieselguhr is activated with hydrogen at a temperature of 280°C for 6 hours, and then is cooled to 20°C. After the activation the catalyst is washed for one hour with liquid isopentane supplied at a space velocity of 10 $hr^{-1}$. Onto the catalyst thus treated isoprene is supplied which is produced by dehydrogenation of isopentane, at a space velocity of 10 $hr^{-1}$. The initial acetylene hydrocarbon content in isoprene is 0.02% by weight. Hydrogen is delivered into the reactor at a ratio of 20 moles of hydrogen per mole of acetylene hydrocarbons.

During the first three minutes of the hydrogenation process the reactor inlet temperature is 20°C, while that of the reactor outlet is 26°C. Then the temperature within the reactor is equalized and is equal to 20°C (inlet temperature) and 22°C (outlet temperature).

The residual content of acetylene hydrocarbons in the purified isoprene is 0.00004% by weight. No isoprene losses are observed.

EXAMPLE 2

A catalyst containing 5% by weight of palladium deposited on alumina is activated with hydrogen at a temperature of 310°C for a period of 10 hours and then cooled to 35°C. After the activation the catalyst is washed for 0.5 hour with liquid butane supplied at a space velocity of 1.5 $hr^{-1}$. After such treatment the catalyst is flooded with liquid butane and then the reactor is fed with butadiene produced by butane dehydrogenation. The space velocity of butadiene supply is 12 $hr^{-1}$; initial content of acetylene hydrocarbons in the butadiene is 0.1% by weight. Hydrogen is supplied into the reactor at a ratio of 5 moles of hydrogen per mole of acetylene hydrocarbons.

During the first three minutes of the hydrogenation process the reactor inlet temperature is 35°C and the reactor outlet temperature is 42°C. Then the temperature within the reactor becomes rather uniform and equal to 35°C at the reactor inlet and 39°C at the reactor outlet.

The residual content of acetylene hydrocarbons in the purified butadiene is 0.0001% by weight. Butadiene losses are not observed.

EXAMPLE 3

A catalyst containing 25% by weight of nickel oxide and 25% by weight of copper deposited on alumina is activated with hydrogen at a temperature of 280°C for a period of 20 hours and then cooled to 30°C. After the activation, the catalyst is washed for 0.5 hour with liquid cyclohexane supplied at a space velocity of 1 hr$^{-1}$. After the treatment, the catalyst is flooded with cyclohexane and then the reactor is fed with hexadiene-1,3 produced by hexane dehydrogenation, at a space velocity of 5 hr$^{-1}$. The initial content of acetylene hydrocarbons in hexadiene-1,3 is 0.2% by weight. Hydrogen is admitted into the reactor at a ratio of 3 moles of hydrogen per mole of acetylene hydrocarbons.

During the first five minutes of the hydrogenation process the reactor inlet temperature is 30°C, while the reactor outlet temperature is 40°C. Then the temperature within the reactor becomes more uniform and equal to 30°C at the reactor inlet and 35°C at the reactor outlet.

The residual content of acetylene hydrocarbons in the purified hexadiene-1,3 is 0.001% by weight. No hexadiene-1,3 losses are observed.

We claim:

1. In a process for purifying diene hydrocarbons from acetylenic hydrocarbons contaminants comprising hydrogenating said acetylenic hydrocarbons with hydrogen over a catalyst which has been pre-activated with hydrogen, the improvement comprising washing said pre-activated catalyst with a saturated liquid hydrocarbon after the preactivation with hydrogen and prior to its use in hydrogenation of the acetylenic hydrocarbons.

2. A process as claimed in claim 1, wherein the catalyst, after washing, is flooded with a saturated liquid hydrocarbon.

3. A process as claimed in claim 1, wherein the saturated liquid hydrocarbon is a hydrocarbon selected from the group consisting of propane, butane, and isopentane.

4. A process as claimed in claim 2, wherein the saturated liquid hydrocarbon is a hydrocarbon selected from the group consisting of propane, butane, and isopentane.

* * * * *